Sept. 5, 1944.  E. D. McKELLAR  2,357,529
WELDING HOLDER
Filed June 21, 1943

E. D. McKellar
INVENTOR.

BY

Patented Sept. 5, 1944

2,357,529

UNITED STATES PATENT OFFICE 2,357,529

WELDING HOLDER

Everett Dougald McKellar, Kirkland, Wash.

Application June 21, 1943, Serial No. 491,689

1 Claim. (Cl. 219—8)

The device forming the subject matter of this application is adapted to hold a welding rod, the construction being such that no metal parts are exposed, to short circuit and cause a flash. The invention aims to provide a device of the class described which will be durable and easily repaired, the article being capable of handling welding rods of different diameters, without side play.

The invention proposes novel means for gripping a welding rod and to supply novel means whereby electrical current may be carried to the welding rod.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In constructing a welding rod holder in accordance with the invention, there is provided a casing 1, which is made preferably of a plastic that is refractory to heat. As indicated at 2, the casing 1 embodies laterally separable parts held together by securing devices, such as countersunk rivets 3 and 4.

Figure 1:
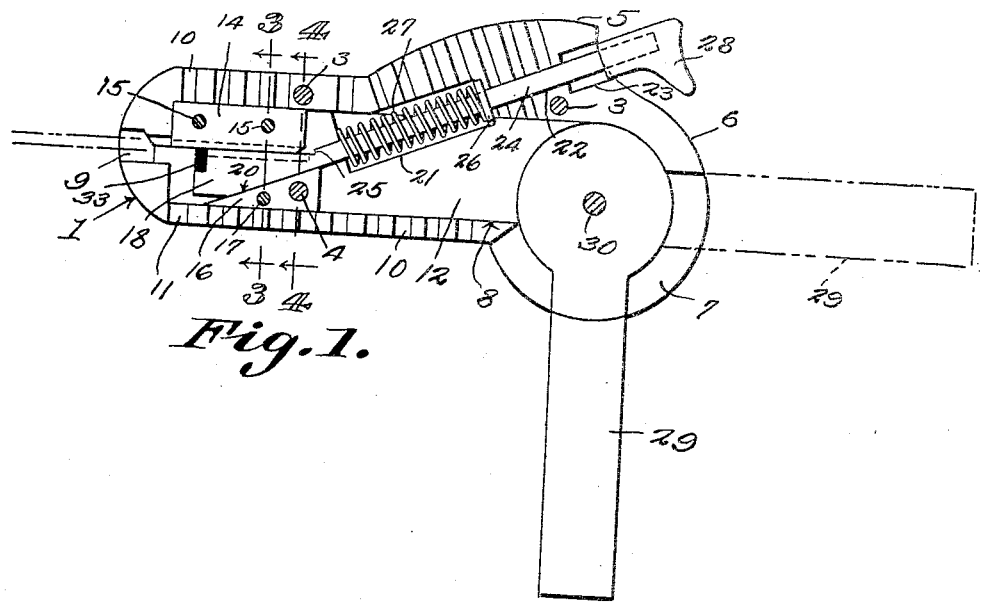
Fig. 1 shows in longitudinal section, a device constructed in accordance with the invention, parts being in elevation.

Near its rear end, the casing 1 is provided with an elongated, upstanding projection 5, merging into a circular, terminal depending head 6, the words "depending" and "upstanding" being used with reference to the device as it appears in Fig. 1 of the drawing.

In the end of the head 6 there is an arcuate slot 7 which communicates with the rear end of an elongated chamber 8, formed in the casing 1. The forward end of the casing 1 has a longitudinal, rod-receiving opening 9, communicating with the chamber 8.

For cooling purposes, the casing 1 is supplied with a plurality of slots 10. Immediately to the rear of the forward wall of the chamber 8, the casing 1 is supplied in its bottom with an opening 11, which affords an exit for material that otherwise be crowded into the device when the welding rod is inserted into the casing through the opening 9.

Figure 2:
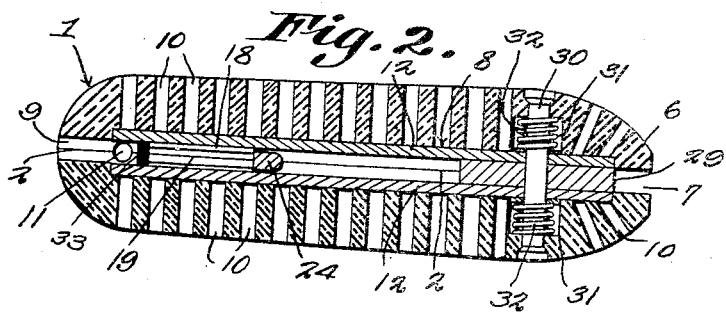
Fig. 2 is a longitudinal section at right angles to the showing of Fig. 1.
Figure 3:
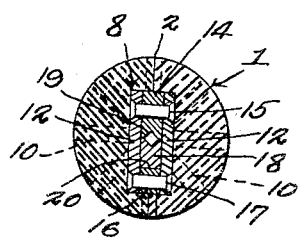
Fig. 3 is a cross section on the line 3—3 of Fig. 1.
Figure 4:
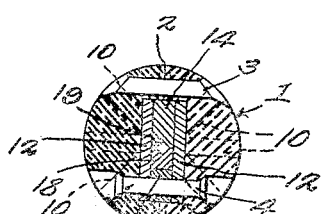
Fig. 4 is a cross section on the line 4—4 of Fig. 1.

In the opposed sides of the chamber 8 are mounted transversely spaced conducting strips 12, which extend backwardly, from the forward end of the chamber, into that portion of the chamber which is located in the head 6. As shown best in Fig. 2, the slots 10 lead inwardly to the conducting strips 12, and enable them to be air-cooled. A fixed jaw 14 is held between the strips 12 by a transverse securing devices 15, such as rivets.

A block or track 16 is held between the conducting strips 12, and on the casing 1, by the securing device 4. A securing device 17 connects the block 16 to the conducting strips 12 only. The block 16 presents a longitudinally inclined surface toward the fixed jaw 14.

A movable, wedge-shaped jaw 18 is mounted for reciprocation on the inclined surface of the block 16 and cooperates with the fixed jaw 14 in gripping a welding rod. The inner surfaces of the jaws 14 and 18 have cooperating longitudinal V-shaped grooves defining an approximately rectangular opening 19 for the reception of a welding rod. The construction last above mentioned results in a firm hold of the jaws 14 and 18 on welding rods of different diameters. The jaw 18 has an inclined longitudinal surface 20, cooperating with the inclined surface of the block or track 16, to advance the jaw 18 transversely toward the jaw 14 when the handle 24 is advanced against the effort of the spring 27, both the handle and the spring being discussed in detail hereinafter.

At its upper, outer corner, the movable jaw 18 is provided with a non-conducting inset 33. The reason for this construction is to give protection to the jaw in case that a "stuck" rod (one that is grounded), is pulled loose from the holder while still making contact. Under such circumstances, there would be a tendency to arc as the rod left the end of the jaw 18, and damage might result.

The conducting strips 12 and the adjacent portions of the casing 1 are cut away to define a recess 21. The recess 21 communicates with the chamber the longitudinal axis of the recess being disposed at an acute angle to the longitudinal axis of the chamber. There is a correspondingly inclined bore 22 in the casing, the forward end of the bore being in communication with the recess 21, the bore having an enlargement 23 at its rear end.

The movable jaw 18 is provided with a straight handle 24, extended through the recess 21 and slidably mounted in the bore 22. The handle 24 is disposed at an acute angle to the longitudinal axis of the chamber 8. At the place of juncture between the handle 24 and the movable jaw 18, there is formed a shoulder 25 which stops the inward movement of the welding rod, as it is inserted through the opening 9 of the casing 1 and into the opening 19 that exists between the jaws 14 and 18.

The handle 24 is supplied with a fixed abutment 26 engaged by the rear end of a compression spring 27. The forward end of the compression spring 27 abuts against a forward shoulder formed in the casing 1 by the recess 21, and against the conducting strips 12, at the forward end of the recess 21. The function of the spring 27 is to thrust the handle 24 backwardly, thereby causing the jaw 18 to coact with the jaw 14 in gripping a welding rod. The recess 21 forms a rear shoulder which constitutes a stop that is engaged by the abutment 26, to limit the rearward movement of the handle 24. A thumb piece 28 is secured to the rear end of the handle 24, and a portion of the thumb piece is received in the enlargement 23 of the bore 22. The thumb piece 28 is made of insulating material and, referring to Fig. 1, it will be noted that even though the handle 24 may have been retracted to the limit, the handle is not exposed, to be touched by an operator, or to cause a short circuit.

The numeral 29 marks a conducting arm, adapted to be assembled with a grip of any desired sort (not shown). The arm 29 extends into the slot 7 of the casing 1, between the conducting strips 12. A shaft 30 is mounted in the rear part 6 of the casing and passes through the rear portions of the conducting strips 12, and through the upper portion of the arm 29. Thus, the casing 1 is mounted for swinging adjustment on the arm 29. The rear end of the handle 24 is located above and closely adjacent to the shaft or pivot element 30. The thumb piece 28 constitutes means on the rear end of the handle 24 for receiving thrust-actuation directly from the hand of an operator when said hand receives the arm 29, and its aforesaid grip (not shown). Enlarged openings 31 are formed in the casing 1, about the shaft 30 and adjacent to the conducting strips 12. Compression springs 32 are disposed in the openings 31, the outer ends of the springs abutting against the casing 1, the inner ends of the springs exerting pressure on the rear portions of the conducting strips 12, to cause them to have a firm, electrical contact with the interposed upper portion of the arm 29.

The spring 27, reacting on the handle 24 and the jaw 18, causes that jaw to cooperate with the fixed jaw 14 in the gripping of a welding rod, the rod being released by advancing the jaw 18 when pressure is exerted on the thumb piece 28.

Current is supplied to the welding rod through the arm 29, the conducting strips 12 and the jaws 14 and 18.

The device forming the subject matter of this application is simple in construction, but it will be found thoroughly efficient to promote the advantages referred to in the opening portion of this specification and at other places hereinbefore.

I claim:

A welding rod holder comprising a casing having an elongated chamber and provided at its forward end with a rod-receiving opening, the casing having a recess communicating with the chamber and defining a forward shoulder and a rear shoulder, the longitudinal axis of the recess being disposed at an acute angle to the longitudinal axis of the chamber, a pair of conducting members fixed in the casing at the sides of the chamber, a fixed jaw disposed between the conducting members and located near the opening and forming a space between said members, a conducting arm extended into said space and engaging the conducting members near the rear end of the casing, a pivot element engaging the arm and the rear portions of the conducting members, a straight handle mounted for longitudinal reciprocation in the casing and extended through the recess, the handle being disposed at said acute angle to the longitudinal axis of the chamber, the rear end of the handle being located above and closely adjacent to the pivot element, means on the rear end of the handle for receiving thrust-actuation directly from the hand of an operator when said hand receives the arm, an abutment on the handle, a compression spring in the recess and engaging the forward shoulder and the abutment, the rear shoulder forming a stop which the abutment engages, a track in the casing and having a longitudinally-inclined surface, and a movable jaw secured to the handle and having an inclined surface cooperating with the inclined surface of the track to move the movable jaw transversely away from the fixed jaw when the handle is advanced against the effort of the spring.

EVERETT DOUGALD McKELLAR.